United States Patent [19]
Lee et al.

[11] Patent Number: 4,759,342
[45] Date of Patent: Jul. 26, 1988

[54] COOKING UTENSIL

[76] Inventors: Kendal A. Lee, 69 Frederick Street, Port-of-Spain, Trinidad and Tobago; Terrence K. Lee, 3273 Pinkerton Dr., San Jose, Calif. 95148; Margaret A. Lee, 69 Frederick Street, Port of Spain, Trinidad and Tobago

[21] Appl. No.: 59,541

[22] Filed: Jun. 8, 1987

[51] Int. Cl.$^4$ ............................................. A47J 27/00
[52] U.S. Cl. ..................................... 126/381; 126/390; 99/347; 220/248
[58] Field of Search ................ 126/369, 373, 381–390; 220/4 A, 427, 428, 20, 22, 369, 373; 99/347, 345, 346, 467

[56]  References Cited
U.S. PATENT DOCUMENTS

| | | | |
|---|---|---|---|
| 1,380,656 | 6/1921 | Lauth | 99/345 |
| 1,471,219 | 10/1923 | Sutton | 99/346 |
| 1,687,099 | 10/1928 | Laun | 99/346 |
| 1,977,486 | 10/1934 | Louis | 99/346 |
| 2,010,915 | 8/1935 | Carpenter | 99/346 |
| 2,481,711 | 9/1949 | Bemis | 99/346 |
| 2,554,412 | 5/1951 | Kavanagh | 126/390 |
| 2,622,591 | 12/1952 | Bramberry | 126/381 |
| 2,948,620 | 8/1960 | Ashley | 99/347 |
| 2,952,764 | 9/1960 | Minami | 126/369 |
| 3,085,498 | 4/1963 | Falla | 99/347 |
| 3,101,707 | 8/1963 | Ryan et al. | 126/381 |
| 3,744,400 | 7/1973 | Woodruff | 99/345 |
| 3,937,210 | 2/1976 | Kachaylo | 126/384 |
| 4,373,511 | 2/1983 | Miles et al. | 126/369 |
| 4,498,376 | 2/1985 | Carey | 99/345 |

FOREIGN PATENT DOCUMENTS

| | | | |
|---|---|---|---|
| 333129 | 4/1921 | Fed. Rep. of Germany . | |
| 339226 | 7/1921 | Fed. Rep. of Germany . | |
| 903349 | 9/1945 | France . | |
| 337484 | 11/1930 | United Kingdom | 126/381 |
| 1287075 | 8/1972 | United Kingdom . | |

Primary Examiner—James C. Yeung
Attorney, Agent, or Firm—Samuel Meerkreebs

[57] ABSTRACT

A cooking utensil having a pan with a bottom wall adapted to be placed on a heating surface, and the bottom pan wall having a food support surface and an open top water reservoir adjacent the food support surface. A lid is also provided to form a closed compartment with the pan. The construction of the pan and lid are such that when the pan bottom is heated to fry a food product on the food support surface, water is simultaneously boiled in the water reservoir to produce steam in the closed compartment.

7 Claims, 3 Drawing Sheets

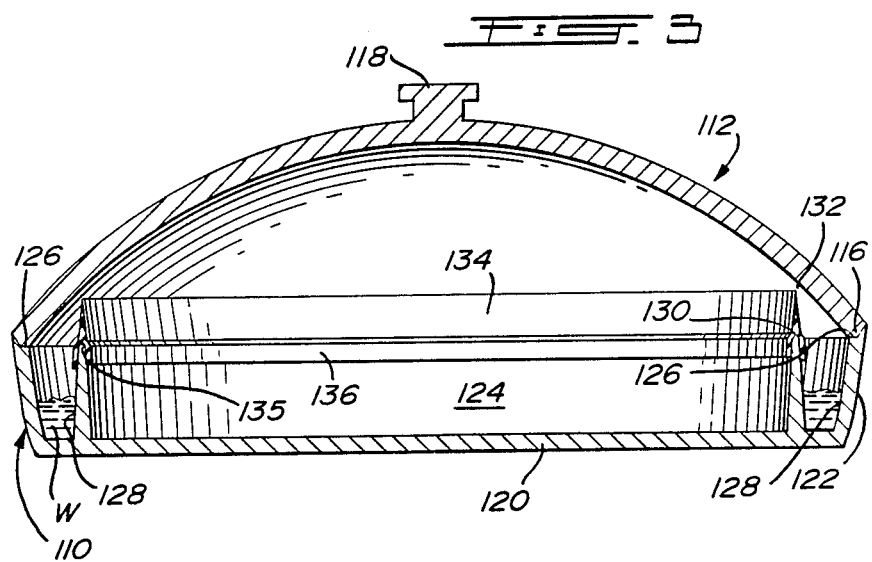
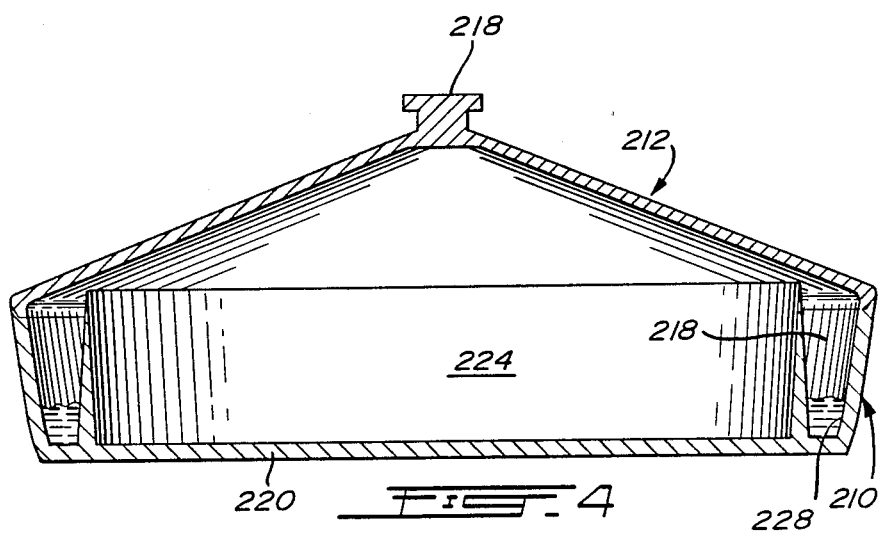

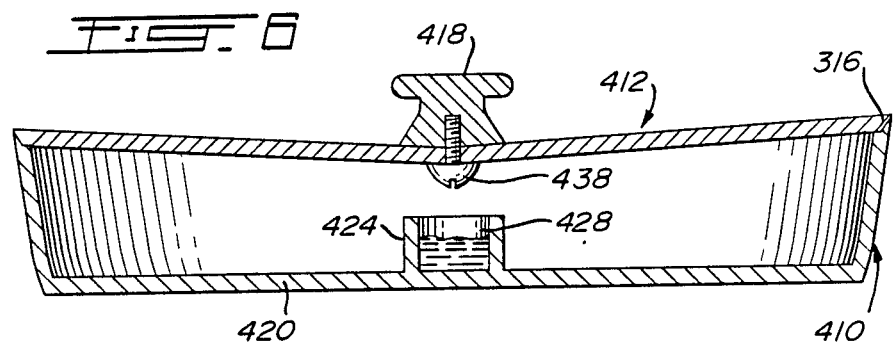
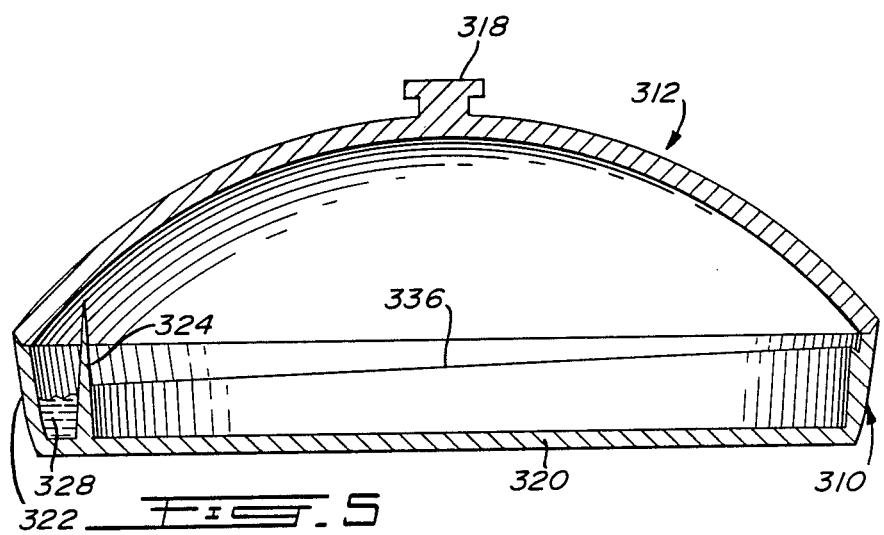
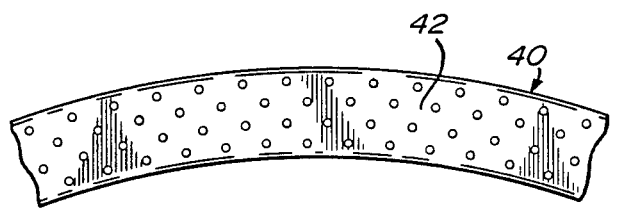

COOKING UTENSIL

BACKGROUND OF THE INVENTION

1. Field of the Invention

The present invention relates to cooking utensils, and more particularly, to an apparatus for cooking by frying while maintaining a moisterized environment in the cooking area.

2. Description of the Prior Art

There are many known roasting devices which incorporate a self-basting feature for basting the food while it is being cooked. These devices usually include a reservoir for collecting juices which emanate from the food while being cooked and means for allowing these juices to be returned to the food. Such devices are illustrated in U.S. Pat. Nos. 1,977,486, Louis, issued Oct. 16, 1934, and 2,010,915, Carpenter, issued Aug. 13, 1935.

When food such as meat is cooked by dry heat, such as by frying or roasting, the resulting flavour is excellent, but the meat dehydrates because the juices of the meat leave the meat during this process.

It is known to provide a steam saturated atmosphere surrounding the food such that the moisture in the food will no longer tend to leave the food in view of the saturated atmosphere.

Attempts to provide such an atmosphere are described in U.S. Pat. Nos. 1,380,656, Lauth, issued June 7, 1921; 3,744,400, Woodruff, issued July 10, 1973; and 4,498,376, Carey, issued Feb. 12, 1985. All of these patents describe a dry heat cooking utensil provided with a water reservoir in the cover or top portion of the utensil with a valve structure to allow the liquid water to drip into the cooking area, where it will presumably turn to steam as the droplets fall onto the pan bottom or on the meat.

Dripping of water onto the meat is undesirable since it tends to harden the meat. Furthermore, the use of valves renders the utensil complicated and more expensive.

SUMMARY OF THE INVENTION

It is an aim of the present invention to provide an improved cooking utensil for frying or roasting, wherein provisions are made for creating a steam atmosphere in the food environment without basting the food with water droplets.

A construction in accordance with the present invention comprises a cooking utensil having a pan with a bottom pan wall adapted to be placed on a heating surface, and the bottom pan wall having a food support surface and an opened top water reservoir adjacent the food support surface. A lid is also provided to form a closed compartment with the pan. The construction is such that when the pan bottom is heated to fry a food product on the food support surface, water is simultaneously boiled in the water reservoir to produce steam in the closed compartment formed by the pan and lid.

In a more specific embodiment of the present invention, the lid has an internal surface sloping towards the water reservoir on the pan such that any water condensing on the lid inner surface will tend to drip into the water reservoir.

In a more specific embodiment of the present invention, the pan includes a peripheral pan wall provided along the edge of the bottom pan wall, and the water reservoir is defined by the peripheral pan wall, bottom pan wall, and an inner wall extending upwardly from the bottom pan wall and at least a portion of which is spaced inwardly from the peripheral wall. The lid is dome shaped with the edge of the lid sitting on the top of the peripheral wall and the reservoir inner wall having an upper edge spaced only slightly from the lid internal surface to provide a narrow gap therebetween to allow the escape of steam from the reservoir into the atmosphere surrounding the food but to reduce splatterings of oil from entering the water reservoir.

BRIEF DESCRIPTION OF THE DRAWINGS

Having thus generally described the nature of the invention, reference will now be made to the accompanying drawings, showing by way of illustration, a preferred embodiment thereof, and in which:

FIG. 3 is a vertical cross-section similar to FIG. 2, taken through another embodiment of the present invention;

FIG. 4 is a vertical cross-section similar to FIG. 2, taken through a still further embodiment of the present invention;

FIG. 5 is a vertical cross-section similar to FIG. 2, taken through a still further embodiment of the present invention;

FIG. 6 is a vertical cross-section similar to FIG. 2, taken through a still further embodiment of the present invention; and FIG. 7 is a top plan view of a detail of the embodiment shown in FIG. 2.

DESCRIPTION OF THE PREFERRED EMBODIMENTS

Figure 1:
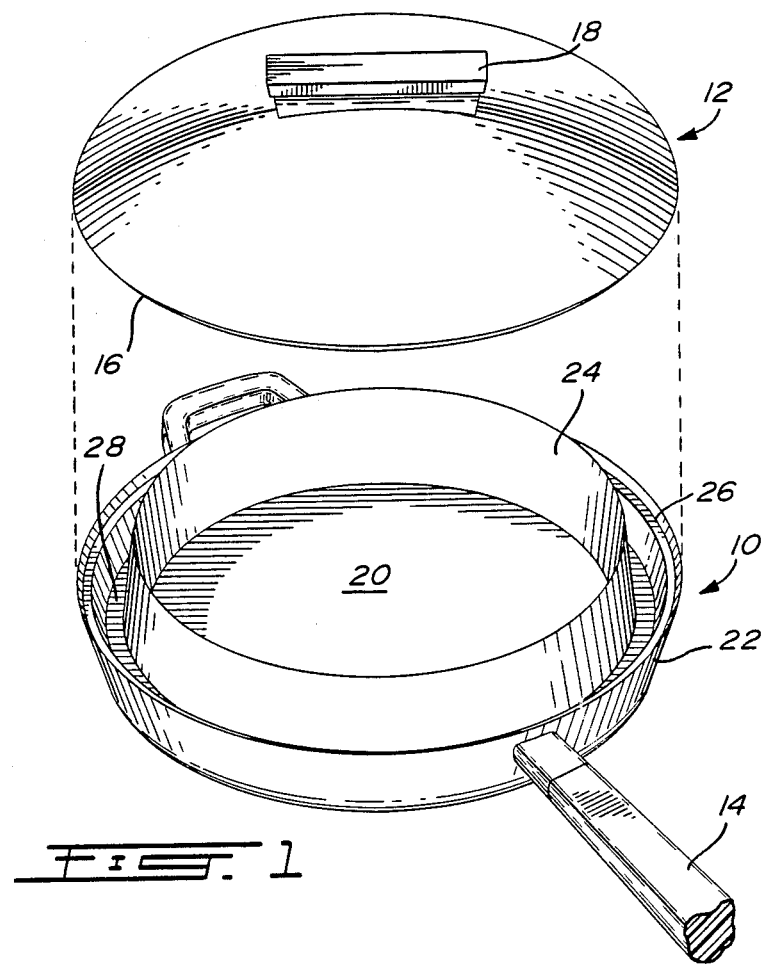
FIG. 1 is a perspective exploded view of an embodiment of the present invention.
Figure 2:
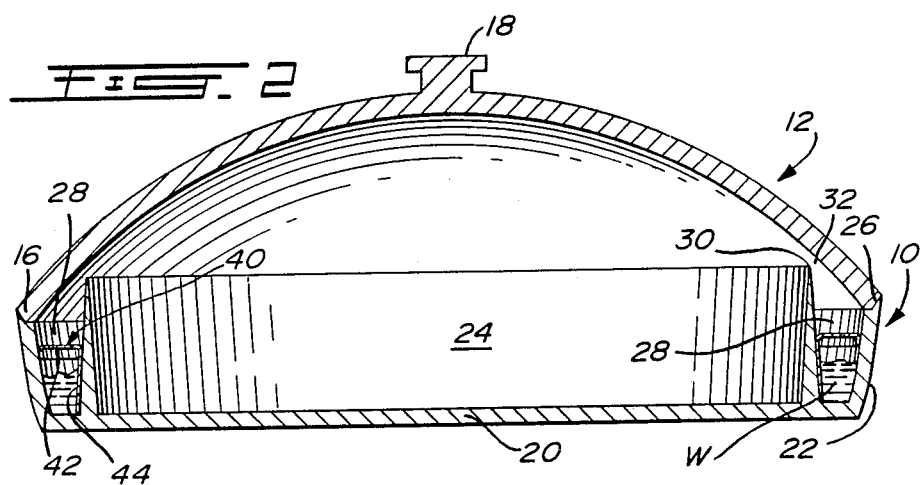
FIG. 2 is a vertical diametric cross-section of a fry pan in accordance with the embodiment shown in FIG. 1.

Referring now to the drawings, and in particular to FIGS. 1 and 2, there is shown a frying pan 10 having a lid 12. The lid, as shown in FIG. 2, is dome shaped. The fry pan 10 has a handle 14 mounted to the peripheral wall 22 thereof.

The fry pan also has a bottom wall 20, and in the case of the embodiment shown in FIGS. 1 and 2, an annular upstanding wall 24. The lid has a handle 18 and a peripheral edge 16 adapted to be seated in a shoulder 26 provided on the upper edge of the peripheral wall 22.

The upstanding wall 24 defines an annular water reservoir 28 which shares the bottom wall 20. The reservoir 28 is also defined by the peripheral wall 22 spaced radially from the annular wall 24. As shown in FIG. 2, the annular wall 24 extends upright close to the inner surface of the dome-shaped lid 12 so as to form a narrow annular gap 32. The upper edge of the annular wall 24 is identified as 30. A splatter cover 40 may be provided in reservoir 28. The splatter cover 40, which is a removable ring, includes a perforated horizontal member 42 (as seen in FIG. 7) and a leg 44, to support the cover 40 within the reservoir 28.

The fry pan 10 is utilized to cook foodstuffs, such as meat, for instance, in a conventional manner on a heating surface. A supply of water is provided in reservoir 28 while the meat is placed on the bottom wall 20 within the confines of the annular wall 24. As is required, butter or other cooking oil will also be provided on the bottom wall 20. The lid 12 is placed on the fry pan 10 such that the peripheral edge 16 is seated on the shoulder 26 of the peripheral wall 22. As heat is applied to the bottom wall 20, the meat will be cooked while the water W in the reservoir 28 will be boiled. The steam produced by boiling the water will escape through the gap 32 into the compartment defined by the lid 12 and the annular wall 24. The purpose for providing steam in this compartment is to establish a moisture equilibrium between the atmosphere surrounding the meat and the moisture content of the meat to prevent the moisture in the meat from escaping.

Any steam which condenses on the dome-shaped lid 12 will drain towards the outer edges 16 thereof back into the reservoir 28. It is essential that condensation not cause droplets of water to fall on the meat or on the cooling oil. Likewise, it is preferable to avoid splattering of the cooking oil into the water reservoir and thus the purpose of the narrow gap 32 to minimize the amount of oil being splattered into the reservoir.

The cooking utensil described above has the advantage of allowing frying or roasting of meats or other foodstuffs, which normally would dehydrate in the dry atmosphere, to retain their moisture by providing a moisture saturated atmosphere therearound.

The embodiment illustrated in FIG. 3 is similar to the embodiment shown in FIGS. 1 and 2. In FIG. 3, like numerals have been raised by 100 and will not all be repeated here in the light of the similarity of the various elements. The upstanding annular wall 124 defining the reservoir 128 with the peripheral wall 122 is cast at the same height as the peripheral wall 122. A separate ring 134 having a bottom groove 135 is adapted to fit on the top edge 130 of the wall 124. This ring 134 may be referred to as a splatter guard and narrows the gap 132.

Referring now to the embodiment shown in FIG. 4, which is similar to the embodiment in FIG. 2, the numerals have been raised by 200. In this embodiment, the lid 212 is cone shaped instead of being dome shaped but allows for the drainage of the condensed water to drain into the reservoir 228.

Referring now to the embodiment in FIG. 5, there is shown a roasting pot 310 having a lid 312. In this case, the reservoir is not an annular trough as in the previous embodiments, but occupies only a short segment of the outer peripheral wall 322. In fact, the upstanding wall 324 is a planar wall extending as a chord defining the reservoir 328 against the otherwise circular wall 322. In order to allow proper drainage of the condensing water in such an embodiment, a groove or ledge is provided at 336 around the inner surface of the wall 322 and at an angle thereto directed to the reservoir 328 to allow the condensed water to drain back into the reservoir 328. Gaps would be provided between the walls 324 at the ends thereof to allow the water to be drained into the reservoir 328.

Other embodiments may be provided where two or more separate reservoirs 328 could be formed depending on the space required for cooking as against the amount of water required to provide a moist atmosphere during the cooking process.

A further embodiment is illustrated in FIG. 6, wherein the numerals have been raised by 400. In this case, the water reservoir 428 is provided centrally of the bottom wall 420 and is defined by an annular wall 424. The lid 412 is an inverted cone such that the condensate will drain towards the center of the lid on the inner surface thereof and will drip off of the head of the screw 438 into the reservoir 428.

We claim:

1. A cooking utensil comprising a frying pan and a lid for covering the pan, the frying pan including a flat bottom wall adapted to be placed on a heating surface and an upstanding peripheral wall, the flat bottom wall divided into a food frying surface area and a water reservoir area adjacent the food frying surface, an upstanding inner wall separating the water reservoir area and the food frying area, said lid being provided to form a closed compartment with the pan, the lid and pan having means allowing any water condensing on the interior surface of the lid to drain back into the water reservoir area, the construction being such that as food is being fried by heat on the food frying surface of the bottom wall, water is simultaneously boiled in the water reservoir to produce steam into the atmosphere of the closed compartment to thereby produce a moisture saturated atmosphere.

2. A cooking utensil as defined in claim 1, wherein said upstanding peripheral wall is provided along the outer edge of the bottom wall, and the water reservoir is defined by said peripheral wall, said bottom wall, and said upstanding inner wall, a portion of which is spaced from the peripheral wall to define the water reservoir.

3. A cooking utensil as defined in claim 2, wherein the lid is dome shaped with the edge of the lid adapted to sit on the top of the peripheral wall of the pan, said upstanding inner wall having an edge spaced close to an inner surface of the dome-shaped lid in order to define a narrow gap therebetween to allow the escape of steam from the reservoir but to reduce the amount of splattering into the reservoir from the food support surface.

4. A cooking utensil as defined in claim 2, wherein the reservoir area is an annular area defined by the upstanding inner wall being annular and spaced inwardly from the peripheral wall of the pan.

5. A cooking utensil as defined in claim 2, wherein the upstanding inner wall is a planar inner wall forming a chord and defining the reservoir with a segment of the peripheral wall.

6. A cooking utensil as defined in claim 2, wherein the lid is in the form of an erect cone such that the water condensing on the interior wall thereof drains towards the peripheral edges of the lid.

7. A cooking utensil as defined in claim 1, wherein the lid is in the form of an inverted cone and the water reservoir is located on the pan bottom wall coinciding with the apex of the cone such that water condensing on the sloping walls of the lid will drain into the water reservoir.

* * * * *

UNITED STATES PATENT AND TRADEMARK OFFICE
CERTIFICATE OF CORRECTION

PATENT NO. :    4,759,342

DATED      :    July 26, 1988

INVENTOR(S) :   Kendal A. Lee, Terrence K Lee, and Margaret A. Lee

It is certified that error appears in the above-identified patent and that said Letters Patent is hereby corrected as shown below:

On the title page, Item [76], "Kendal A. Lee" should read -- Kendal A. Lee(Deceased) --.

Signed and Sealed this

Fourteenth Day of March, 1989

*Attest:*

DONALD J. QUIGG

*Attesting Officer*  *Commissioner of Patents and Trademarks*